United States Patent [19]

Nelson

[11] Patent Number: 4,873,278

[45] Date of Patent: Oct. 10, 1989

[54] INHIBITION OF IRRADIATION YELLOWING IN POLYSULFONE COMPOSITIONS

[75] Inventor: Linda H. Nelson, Evansville, Ind.

[73] Assignee: General Electric Company, Mt. Vernon, Ind.

[21] Appl. No.: 930,518

[22] Filed: Nov. 14, 1986

[51] Int. Cl.$^4$ .................... C08K 5/05; C08K 5/13; C08K 5/02; C08K 5/03

[52] U.S. Cl. .................... 524/380; 524/207; 524/247; 524/248; 524/249; 524/250; 524/384; 524/385; 524/386; 524/387

[58] Field of Search .............. 524/323, 346, 347, 386, 524/387, 540, 380, 384, 207, 247, 248, 249, 250, 385; 522/79, 69, 68

[56] References Cited

U.S. PATENT DOCUMENTS

| | | | |
|---|---|---|---|
| 3,642,946 | 2/1972 | Grabowski | 525/67 |
| 3,836,099 | 9/1974 | Mathis | 524/357 |
| 4,065,517 | 12/1977 | Okada et al. | 524/540 |
| 4,255,319 | 3/1981 | Peters | 524/357 |
| 4,274,932 | 6/1981 | Williams et al. | 522/79 |
| 4,369,136 | 1/1983 | Robeson et al. | 524/456 |
| 4,409,317 | 10/1983 | Shiraishi | 522/79 |
| 4,503,168 | 3/1985 | Hartsing, Jr. | 524/413 |
| 4,532,288 | 7/1985 | Robeson | 524/370 |
| 4,551,493 | 11/1985 | Blinne et al. | 524/370 |

*Primary Examiner*—John Kight
*Assistant Examiner*—Kriellion Morgan
*Attorney, Agent, or Firm*—Martin B. Barancik

[57] ABSTRACT

A radiation sterilized polysulfone resin composition exhibiting improved color stability comprising: (i) at least one polysulfone resin; and (ii) an amount effective to inhibit yellowing of said polysulfone resin upon its exposure to sterilizing radiation of at least one stabilizing compound selected from carboxylic acid esters, alcohols, epoxides, sulfones, diketones, thio compounds, alkenes, hydroaromatics, cyclic ethers, and mixtures thereof.

9 Claims, No Drawings

INHIBITION OF IRRADIATION YELLOWING IN POLYSULFONE COMPOSITIONS

BACKGROUND OF THE INVENTION

Polysulfone resins are well known thermoplastic materials which, due to their many advantageous properties, find use as thermoplastic engineering materials. Because of their excellent mechanical properties polysulfone resins have been proposed for various utilities including those relating to the medical field such as those relating to medical packaging, for example containers in which syringes, surgical instruments, intravenous fluids, operating room devices, and the like are stored or maintained. Additionally, the polysulfones have been proposed for medical devices such as blood oxygenators, anesthesia canisters, blood leak detectors, blood centrifuge bowls, surgical instruments and operating room instruments. The toughness of the polysulfones as well as their optical clarity, high heat resistance, strength, and physiological inertness render them suitable for use in this area of medical devices and packaging. However, in order to be used in the medical field, as well as in some other areas, sterilization of these articles is often required.

A typical method of sterilizing various articles and objects useful in the medical field is through irradiation. The type of radiation usually employed is low level gamma or electron beam radiation. It is readily apparent that the level of such radiation which accomplishes the sterilization is significantly above that of ordinary background radiation. When exposed to radiation which is of sufficient intensity and duration to sterilize various objects made from polysulfone resins the resinous material is subject to yellowing. This yellowing of the polysulfone resin reduces its clarity and alters its appearance thereby reducing its utility. Not only packaging materials such as flexible polysulfone films and sheets but also molded parts suffer from this yellowing phenomenon.

It would thus be very advantageous if polysulfone resin compositions could be provided which did not exhibit this yellowing after exposure to sterilizing irradiation. It is, therefore, an object of the instant invention to provide polysulfone compositions which exhibit improved resistance to yellowing upon exposure to sterilizing radiation.

SUMMARY OF THE INVENTION

In accordance with the instant invention there are provided sterilizing radiation color stabilized polysulfone resin compositions which contain an amount of stabilizing compound which is effective to inhibit or retard yellowing upon exposure of said compositions to sterilizing radiation. The stabilizing compounds are selected from organic esters, alcohols, epoxides, thio compounds, diketones, alkenes, hydroaromatics, cyclic ethers, and sulfones.

DESCRIPTION OF THE INVENTION

It has been discovered that polysulfone resins can be stabilized against discoloration, i.e., yellowing, upon exposure to sterilizing radiation by use of certain stabilizing or color retarding compounds. More particularly, the polysulfone resins are admixed with an effective amount of at least one of the stabilizing compounds described hereinafter to form compositions or blends which when exposed to sterilizing radiation exhibit improved resistance to discoloration as compared with neat polysulfone resins. The instant compositions thus comprise (i) at least one polysulfone resin, and (ii) an amount effective to stabilize said resin against yellowing or retard yellowing in said resin upon exposure to sterilizing radiation of at least one stabilizing compound.

The term "polysulfone resin" as used herein is intended to encompass those sulfone polymers containing the sulfone group. Such materials are well known in the art and are amply described in the literature including, inter alia, U.S. Pat. No. 3,642,946; Modern Plastics Encyclopedia, 1977-78, pp. 108, 110-112; Kirk-Othmer, Encyclopedia of Chemical Technology, Second Edition. Vol. 16, pp. 272-281 (1968); and Handbook of Plastics and Elastomers, C. A. Harper, ed., McGraw-Hill, Inc. 1975, pp. 1-69 and 95-96, all of which are incorporated herein by reference. Representative polymers of this type include polysulfones, polyether sulfones, and polyphenyl sulfones.

The polysulfones that may be utilized in the instant invention contain at least one recurring structural unit represented by the general formula

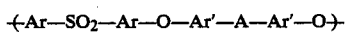

$$\text{---}(\text{Ar}\text{---}\text{SO}_2\text{---}\text{Ar}\text{---}\text{O}\text{---}\text{Ar}'\text{---}\text{A}\text{---}\text{Ar}'\text{---}\text{O})\text{---} \qquad \text{I.}$$

wherein Ar and Ar' are independently selected from the group consisting of phenylene, alkyl, alkoxy, halogen and nitro substituted phenylene; and A is selected from the group consisting of carbon-to-carbon bonds, alkylidene, cycloalkylidene, carbonyl sulfoxide, sulfur, sulfone, azo, imino, and oxygen.

The polysulfones of Formula I are preferably derived from dichlorodiphenyl sulfones reacted with bisphenols. A second group of sulfones represented by Formula I is where Ar and Ar' are phenylene and A is sulfone. A third major group of polysulfones represented by Formula I are those wherein Ar and Ar' are phenylene and A is oxygen, i.e., the polyarylethersulfones. When Ar is phenylene, it should preferably be either meta or para and may be substituted in the ring positions with alkyl groups such as methyl, ethyl, and propyl. The alkoxy groups may be groups such as methoxy and propoxy. Particularly useful polysulfones are those derived from disulfonyl chlorides such as 4,4-biphenyldisulfonyl chloride reacted with diphenyl ether.

The polysulfones useful in the present invention may be prepared in a variety of ways such as by nucleophilic aromatic substitution which is described in the journal of Polymer science, PTA- 152375-98 (1967) or by condensation procedures which are described in British Pat. No. 1,060,546, both of which are incorporated herein by reference. The polyarylethersulfones contain at least the following recurring structural units:

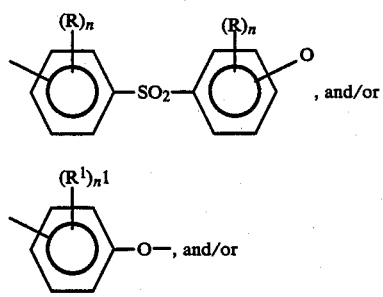

-continued

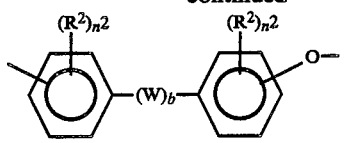
IIb.

wherein R, R¹ and R² are independently selected from C₁-C₆ alkyl, C₄-C₈ cycloalkyl, and halogen radicals; W is a C₂-C₈ alkylene, a C₁-C₈ alkylidene, a cycloalkylene or cycloalkylidene radical containing from 4 to about 16 ring carbon atoms; b is either zero or one; and n, n¹ and n² are independently selected from integers having a value of from 0 to 4 inclusive.

A particularly useful polyarylethersulfone is one which contains at least one recurring structural unit represented by the formula

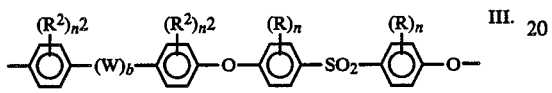
III.

wherein R², R, W, b, n and n² are as defined hereinafore. Particularly useful polyarylethersulfones of Formula III are those wherein b is one and W is an alkylidene radical, preferably the isopropyildene radical. Of these types of polyarylethersulfones those wherein n and n² are zero are particularly useful. The preparation of these polyarylethersulfones, as well as the resins themselves, is described in U.S. Pat. No. 4,503,168, incorporated herein by reference.

The stabilizing compounds useful in the instant invention are those which when admixed with the aforedescribed polysulfones are effective in stabilizing the polysulfones against yellowing upon exposure to sterilizing radiation. That is to say, they are effective in reducing the yellowing of the polysulfone upon exposure to sterilizing radiation. These stabilizing compounds are selected from organic esters, alcohols, thio compounds such as the thiols and thioethers, diketones, alkenes, hydroaromatics, epoxides, cyclic ethers, and the sulfone compounds.

The organic esters useful as stabilizers herein are characterized by having at least one ester moiety represented by the formula

bonded to an organic moiety. R³ is a monovalent hydrocarbon radical or a substituted monovalent hydrocarbon radical. The monovalent hydrocarbon radicals represented by R³ include the aliphatic radicals and the aromatic radicals. The aliphatic radicals may contain olefinic unsaturation, and may be linear or cyclic. The monovalent hydrocarbon radicals represented by R³ include the alkyl radicals, both the straight chain alkyl radicals and the branched alkyl radicals; the alkenyl radicals, both branched and straight chain; the cycloalkyl radicals; the cycloalkenyl radicals; the aryl radicals; the aralkyl radicals; and the alkaryl radicals. The preferred alkyl radicals are those containing from 1 to about 20 carbon atoms. The preferred alkenyl radicals are those containing from 2 to about 20 carbon atoms. These alkenyls may contain only one site of olefinic unsaturation or they may be di- or polyunsaturated, e.g., dienes. The preferred cycloalkyl radicals are those containing from about 4 to about 8 ring carbon atoms. The preferred cycloalkenyl radicals are those containing from about 4 to about 8 ring carbon atoms. These cycloalkenyl radicals may contain only one site of olefinic unsaturation or they may contain two sites of olefinic unsaturation, The preferred aralkyl and alkaryl radicals are those containing from 7 to about 14 carbon atoms The preferred aryl radicals are those containing from 6 to 12 ring carbon atoms, i.e., phenyl, naphthyl and biphenyl.

The substituted monovalent hydrocarbon radicals are the monovalent hydrocarbon radicals described above which contain substituent groups thereon, preferably from 1 to about 3 substituent groups The preferred substituent groups are the halogens, hydroxyl, amino, and nitro groups The substituent groups may be same or different.

These ester compounds may be mono-, di-, or polyfunctional, i.e., they may contain one, two or more ester moieties These ester compounds may be represented by the general formula

wherein R³ is as defined hereinafore; m is a positive integer having a value of from 1 up to the number of replaceable hydrogen atoms present on R⁴, but preferably has a value of from 1 to about 3; and R⁴ is an m valent hydrocarbon or substituted hydrocarbon radical. The m valent hydrocarbon radicals represented by R⁴ may be aliphatic, cycloaliphatic, aromatic, or aliphatic-aromatic radicals When R⁴ is an aliphatic radical it may be fully saturated or may contain one or more olefinic unsaturation sites The preferred m valent aliphatic hydrocarbon radicals are those containing from 1 to about 20 carbon atoms. The preferred m valent cycloaliphatic hydrocarbon radicals are those containing from about 4 to about 8 ring carbon atoms. These cycloaliphatic hydrocarbon radicals may contain olefinic unsaturation in the ring. The preferred m valent aliphatic-aromatic hydrocarbon radicals represented by R⁴ are those containing from 7 to about 14 carbon atoms. The preferred m valent aromatic hydrocarbon radicals are those containing from 6 to 12 ring carbon atoms.

Thus, for example, when R⁴ is a monovalent hydrocarbon radical, i.e., m is one, it may be an alkyl radical, an alkenyl radical, a cycloalkyl radical, a cycloalkenyl radical, an aryl radical, an aralkyl radical, or an alkaryl radical. If R⁴ is a divalent hydrocarbon radical, i.e., m is two, it may be an alkylene radical, an alkylidene radical, a cycloalkylene radical, a cycloalkylidene radical, an alkenylene radical, an alkenylidene radical, a cycloalkenylene radical, a cycloalkenylidene radical, an arylene radical, an aralkylene radical, or an alkarylene radical.

The m valent substituted hydrocarbon radicals represented by R⁴ are those m valent hydrocarbon radicals described hereinafore which contain substituent groups. The number of substituent groups may vary but is preferably from 1 to about 4 substituent groups per m valent hydrocarbon radical. The preferred substituent groups are halogen, hydroxyl, amino, and nitro. The substituent groups may be the safe or they may be different.

These esters can be conveniently prepared from the corresponding carboxylic acids. Thus, for example, the monoesters can be prepared from the corresponding monocarboxylic acids, the diesters from the corresponding dicarboxylic acids, the triesters from the corresponding tricarboxylic acids, and so on. These esters may also conveniently be prepared by transesterification processes. These esters are well known in the art and along with the processes for their preparation are amply described in the literature these esters are generally commercially available or may be readily prepared by known processes.

Some illustrative non-limiting examples of esters include diethyl phthalate, diethyl malonate, dimethyl malonate, ethyl adipate, n-propyl acetate, n-pentyl acetate, p-ethylbenzyl acetate, methyl cyclopropylacetate, n-butyl 2,4,6-trimethylbenzoate, p-nitrophenyl acetate, isobutyl benzoate, benzyl acetate, ethyl-o-bromobenzoate, tetrakis(methylene[3,5-di-t-butyl-4-hydroxyhydrocynnamate])methane, and 2,2'-oxamido bis(ethyl-3-(3,5-di-t-butyl-4-hydroxyphenyl)propionate.

The thio compounds useful as stabilizers include thiols, thioethers, and the cyclic thioethers. These organosulfur compounds are well known in the art and are amply described in the literature, for example Roberts, J. D., and Caserio, M. C., Basic Principles of Organic Chemistry, W. A. Benjamin, Inc., N.Y., N.Y., 1964, pp. 745-758, incorporated herein by reference. The thiols may be represented by the general formula $R^5$—S—H wherein $R^5$ has the same meaning as $R^3$ hereinafore. The thioethers may be acyclic or cyclic thioethers. The cyclic thioethers may be aliphatic or aromatic in character. Furthermore, these thioethers, both cyclic and acyclic, may be monoethers, i.e., contain only one thioether moiety, or they may be polythioethers, i.e., contain two or more thioether moieties. The acyclic thioethers may be represented by the general formula

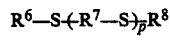   IV.

wherein:
$R^6$ and $R^8$ independently have the same meaning as $R^3$ hereinafore;
$R^7$ is a divalent hydrocarbon radical; and
p is an integer having a value of from 0 to about 4.

The preferred divalent hydrocarbon radicals represented by $R^7$ are the aliphatic divalent hydrocarbon radicals. The preferred divalent aliphatic hydrocarbon radicals are the alkylene radicals. The preferred alkylene radicals are those containing from 1 to about 5 carbon atoms, with the methylene radical being preferred.

The acyclic monothioethers are those of Formula IV wherein p is zero. The acyclic polythioethers are those of Formula IV wherein p is at least one. A particularly useful acyclic polythioether is one of Formula IV wherein p is one and $R^7$ is methylene.

The cyclic thioethers may be represented by the general formula

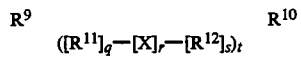   V.

wherein:
$R^9$ and $R^{10}$ are independently selected divalent hydrocarbon radicals or substituted divalent hydrocarbon radicals;
X is a hetero atom selected from oxygen, sulfur, and nitrogen;

$R^{11}$ and $R^{12}$ are independently selected from divalent hydrocarbon radicals;
q is either zero or one;
r is either zero or one;
s is either zero or one; and
t has a value of from 0 to about 4.

The divalent hydrocarbon radicals represented by $R^9$ and $R^{10}$ are preferably the aliphatic divalent hydrocarbon radicals. The preferred divalent aliphatic hydrocarbon radicals are the alkylene radicals. The preferred alkylene radicals are those containing from 1 to about 5 carbon atoms. These alkylene radicals may contain substituent groups, preferably from 1 to about 3 substituent groups, thereon. The preferred substituent groups are halogen and hydroxyl groups. The divalent hydrocarbon radicals represented by $R^{11}$ and $R^{12}$ are preferably the aliphatic divalent hydrocarbon radicals. The preferred divalent aliphatic hydrocarbon radicals are the alkylene radicals, with alkylene radicals containing from 1 to about 5 carbon atoms being preferred. Of these methylene is the preferred alkylene radical. The cyclic monothioethers are those of Formula V wherein t is zero. The cyclic polythioethers are those wherein t is at least one. Particularly useful cyclic thioethers of Formula V are those represented by the formula

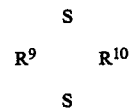   Va.

wherein $R^9$ and $R^{10}$ are as defined hereinafore. Of these cyclic dithioethers those wherein $R^9$ or $R^{10}$ represent methylene are particularly preferred.

The aromatic cyclic thioethers are those containing a sulfur ring atom in an aromatic heterocyclic ring structure. These include compounds represented by the formula

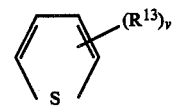   VI.

wherein $R^{13}$ is independently selected from monovalent hydrocarbon radicals or halogen radicals; and v has a value of from 0 to 4. The monovalent hydrocarbon radicals represented by $R^{13}$ include the alkyl, cycloradicals alkyl, aryl, aralkyl, and alkaryl radicals. The preferred alkyl radicals are those containing from 1 to about 10 carbon atoms. The preferred cycloalkyl radicals are those containing from 4 to about 8 ring carbon atoms. The preferred aralkyl and alkaryl radicals are those containing from 7 to about 14 carbon atoms. The preferred aryl radicals are containing from 6 to 12 ring carbon atoms, i.e., phenyl, naphthyl and biphenyl.

Some illustrative non-limiting examples of these organosulfur compounds include ethanethiol, thiophenol, thiacyclobutane, 1,2,4,6-tetraphenylthiabenzene, cyclohexanethiol, acetone trimethylene dithioketal, dilaurylthiopropionate, 1,4-dithiane, and 1,4,8,11-tetrathiocyclotetradecane. Preferred are the cyclic thioethers, especially cyclic thioethers containing more than one thioether group. A particularly preferred cyclic thioether contains one intervening carbon atom between two thioether groups, e.g., 1,3-dithiane.

The diketones useful as stabilizers in the instant invention are well known compounds which are generally commercially available or may readily be prepared by known methods. These diketones may be represented by the general formula

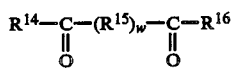   VII.

wherein:
$R^{14}$ nd $R^{16}$ independently have the same meaning as $R^3$ hereinafore;
$R^{15}$ is a divalent hydrocarbon radical; and
w is either zero or one.

The preferred divalent hydrocarbon radicals represented by $R^{15}$ are the aliphatic divalent hydrocarbon radicals. The preferred divalent aliphatic hydrocarbon radicals are the alkylene radicals. The preferred alkylene radicals are those containing from 1 to about 10 carton atoms. Particularly useful diketones of Formula VII are those wherein w is one and $R^{15}$ is an alkylene radical. The preferred alkylene radical is methylene.

Some illustrative non-limiting examples of these diketones include 2,4-pentadione, 3,5-hexadione, 2,4-decadione, diphenyl diketone, and the like.

The cyclic ethers useful as stabilizers herein are the five to about 8 membered heterocyclic structures containing ring carbon atoms and at least one ring oxygen atom wherein at least one ring carbon atom directly adjacent to the ring oxygen atom is substituted with a hydrocarbonoxy substituent group. These cyclic ethers may be fully saturated or they may contain olefinic unsaturation, i.e., one or two carbon to carbon double bonds in the ring structure.

The cyclic ethers may be represented by the general formula

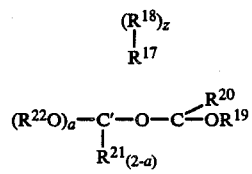   VIII.

wherein:
$R^{17}$ is an alkylene radical, an alkenylene radical, an alkylene radical containing at least one ether linkage, or an alkenylene radical containing at least one ether linkage;
$R^{18}$ is independently selected from halogen, hydroxyl, monovalent hydrocarbon radicals, substituted monovalent hydrocarbon radicals, monovalent hydrocarbonoxy radicals, monovalent hydrocarbonoxy radicals containing at least one ether linkage, substituted monovalent hydrocarbonoxy radicals, and substituted monovalent hydrocarbonoxy radicals containing at least one ether linkage;
$R^{19}$ and $R^{22}$ are independently selected from monovalent hydrocarbon radicals, substituted monovalent hydrocarbon radicals, monovalent hydrocarbon radicals containing at least one ether linkage, and substituted monovalent hydrocarbon radicals containing at least one ether linkage;
$R^{20}$ and $R^{21}$ are independently selected from hydrogen, halogen, and monovalent hydrocarbon radicals, provided at least one of $R^{20}$ or $R^{21}$ is hydrogen;
a is either zero or one with the proviso that if a is one and C' is bonded to a carbon atom of $R^{17}$ then it is bonded to said carbon atom of $R^{17}$ by a single carbon-to-carbon bond; and
z is an integer having a value of from 0 up to the number of replaceable hydrogen atoms present on $R^{17}$.

In Formula VIII C' may be bonded to either a carbon atom or an oxygen atom of $R^{17}$. If C' is bonded to a carbon atom of $R^{17}$ and a is zero, i.e., C' does not contain a hydrocarbonoxy substituent group, then it may be bonded to said bond. If a in Formula VIII is one and C' is bonded to a carbon atom of $R^{17}$ then it is bonded to said carbon atom by a single bond.

C in Formula VIII may likewise be bonded to a carbon atom or oxygen atom of $R^{17}$. However, if C is bonded to a carbon atom of $R^{17}$ it is bonded to said carbon atom by a single bond.

The alkylene radicals represented by $R^{17}$ contain from 2 to about 5 carbon atoms. The alkenylene radicals represented by $R^{17}$ contain from 2 to about 5 carbon atoms and one or two double bonds. It is to be understood that if $R^{17}$ is an alkenylene radical and a is zero than one of the double bonds in the alkenylene radical may be formed between the end carbon atom of $R^{17}$ and C'. The alkylene radicals containing at least one ether linkage contain from 1 to about 4 carbon atoms and 1 or 2 oxygen atoms. It is to be understood that C' may be bonded to either a carbon atom of $R^{17}$ or to an oxygen atom of $R^{17}$ wherein $R^{17}$ contains ether linkages. The alkenylene radicals represented by $R^{17}$ contain from 2 to about 4 carbon atoms and zero, one, or 2 oxygen atoms.

The monovalent hydrocarbon radicals and substituted monovalent hydrocarbon radicals represented by $R^{18}$ are the same as those defined for $R^3$ hereinafore. The preferred monovalent hydrocarbon radicals represented by $R^{18}$ are the alkyl radicals, while the preferred substituted monovalent hydrocarbon radicals are the substituted alkyl radicals.

The monovalent hydrocarbonoxy radicals represented by $R^{18}$ are those represented by the formula —$OR^{23}$ wherein $R^{23}$ is a monovalent hydrocarbon radical of the type defined for $R^3$ hereinafore. The substituted monovalent hydrocarbonoxy radicals represented by $R^{18}$ are represented by —$OR^{24}$ wherein $R^{24}$ is a substituted monovalent hydrocarbon radical of the type defined for $R^3$ hereinafore. Preferred monovalent hydrocarbonoxy radicals are the alkoxy and aryloxy radicals.

The monovalent hydrocarbonoxy radicals containing at least one ether linkage represented by $R^{18}$ are those containing from 1 to about 5 ether linkages, i.e., one to five oxygen atoms. These radical maybe represented by the formula

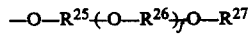

wherein $R^{25}$ and $R^{26}$ are independently selected from divalent hydrocarbon radicals, $R^{27}$ is a monovalent hydrocarbon radical of the type defined for $R^3$ hereinafore, and f is an integer having a value of from 0 to 3. The divalent hydrocarbon radicals represented by $R^{25}$ and $R^{26}$ include the alkylene, alkylidene, alkenylene, cycloalkylene, cycloalkylidene, cycloalkenylene, and arylene radicals. The preferred alkylene radicals are those containing from 1 to about 10 carbon atoms. The preferred alkylidene radicals are those containing from 2 to about 10 carbon atoms. The preferred alkenylene radicals are those containing from 2 to about 10 carbon atoms and from 1 to about 3 double bonds. The preferred cycloalkylene, cycloalkylidene, and cycloalkenylene radicals are those containing from about 4 to about 8 ring carbon atoms. The preferred arylene radicals are those containing from 6 to 12 ring carbon atoms. The preferred hydrocarbonoxy radicals containing at least one ether linkage are those wherein $R^{25}$ and $R^{26}$ are independently selected from alkylene radicals and $R^{27}$ is an alkyl radical.

The monovalent substituted hydrocarbonoxy radicals containing at least one ether linkage are those monovalent hydrocarbonoxy radicals containing at least one ether linkage and having at least one substituent group on at least one of $R^{25}$, $R^{26}$ or $R^{27}$ The preferred substituent groups are halogen, hydroxyl, amino, and nitro. The substituent groups may be the same or different.

The monovalent hydrocarbon radicals represented by $R^{20}$ and $R^{21}$ are those as defined for $R^3$ hereinafore. Preferably $R^{20}$ and $R^{21}$ are independently selected from hydrogen and lower alkyl, i.e., $C_1$–$C_5$, radicals The monovalent hydrocarbon radicals and substituted monovalent hydrocarbon radicals represented by $R^{19}$ and $R^{22}$ are those as defined for $R^3$ hereinafore The monovalent hydrocarbon radicals and substituted monovalent hydrocarbon radicals containing at least one ether linkage are those which preferably contain from 1 to about 4 ether linkages, i.e., one to about 4 oxygen atoms. These ether linkage containing radicals may be represented by the formula

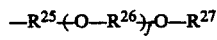

wherein $R^{25}$–$R^{27}$ and f are as defined hereinafore.

The cyclic ethers of Formula VIII include the partially or fully hydrogenated derivatives of pyrans and the fully hydrogenated derivatives of furans. An example of the partially hydrogenated derivatives of pyrans are those compounds represented by the formula

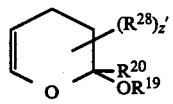

VIIIa.

wherein $R^{19}$ and are as defined hereinafore, z' is an integer having a value of from 0 to 5, and $R^{28}$ is independently halogen, hydroxyl, monovalent hydrocarbon radical such as $R^3$, or substituted monovalent hydroradical carbon radical such as $R^3$ In Formula VIIIa $R^{20}$ is preferably hydrogen.

Some illustrative non-limiting examples of the derivatives of pyrans include 3,4-dihydro-2-ethoxy-2-pyran, dihydroxypyranyl ethers, and tetrahydroxypyranyl ethers.

The sulfone compounds which are suitable for use as stabilizers herein may be represented by the general formula

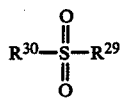

IX.

wherein $R^{29}$ and $R^{30}$ are independently selected from monovalent hydrocarbon radicals and substituted monovalent hydrocarbon radicals. The monovalent hydrocarbon radicals include the alkyl, alkenyl, cycloalkyl, cycloalkenyl, aralkyl, alkaryl, and aryl radicals. The preferred alkyl radicals are those containing from 1 to about 20 carbons and include the straight chain and branched alkyl radicals. The preferred alkenyl radicals are those containing from 2 to about 20 carbons and from 1 to about 4 olefinic unsaturation sites, i.e., carbon-to-carbon double bonds. The preferred cycloalkyl radicals are those containing from about 4 to about 8 ring carbons. The preferred cycloalkenyl radicals are those containing from about 4 to about 8 ring carbons and one or two ring carbon-to-carbon double bonds. The preferred aralkyl and alkaryl radicals are those containing from 7 to about 14 carbon atoms. The preferred aryl radicals are those containing from 6 to 12 ring carbons, i.e., phenyl, biphenyl, and naphthyl.

The substituted monovalent hydrocarbon radicals are those monovalent hydrocarbon radicals described above which contain at least one substituent group thereon. The substituent groups are preferably selected from hydroxyl, halogen, amino, and nitro groups.

Preferred sulfone compounds of Formula IX are those wherein at least one of $R^{29}$ and $R^{30}$ is an aralkyl radical, preferably benzyl.

The sulfone compounds are well known in the art and are generally commercially available or may be readily prepared by known methods. Some illustrative non-limiting examples of sulfones include benzylsulfone, diphenyl sulfone, methyl phenyl sulfone, dimethyl sulfone, ethyl methyl sulfone, naphthyl phenyl sulfone, t-butyl ethyl sulfone, cyclohexyl phenyl sulfone, pentyl phenyl sulfone, and phenyl hexyl sulfone.

Suitable hydroaromatic compounds are the partially hydrogenated carbon skeletons of an aromatic system or an aromatic system in combination with an unsaturated ring. Preferred aromatic systems are benzene or naphthalene based systems. Some illustrative non-limiting examples of suitable hydroaromatic compounds are indane, 5,6,7,8-tetrahydro-1-naphthol, 5,6,7,8-tetrahydro-2-naphthol, 9,10-dihydroanthracene, 9,10-dihydrophenanthrene, dihydrophenanthrene-1-phenyl-1-cyclohexene, 1,2,3,4-tetrahydro-1-naphthol, and the like.

The alkenes suitable for use herein are well known compounds which are amply described in the literature and which are generally commercially available or may readily be prepared by conventional and well known methods. These alkenes will in general conform to the formula

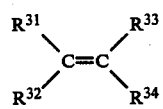

X.

wherein $R^{31}$, $R^{32}$, $R^{33}$ and $R^{34}$ are independently selected from hydrogen, monovalent hydrocarbon radicals, substituted monovalent hydrocarbon radicals. The monovalent hydrocarbon radicals include the alkyl, alkenyl, cycloalkyl, cycloalkenyl, alkaryl, aralkyl, and aryl radicals. The preferred alkyl radicals are those containing from 1 to about 20 carbons, either straight chain or branched. The preferred alkenyl radicals are those containing from 2 to about 20 carbon atoms. These alkenyl radicals may contain from 1 to about 4 olefinic unsaturation sites, i.e., from 1 to about 4 carbon-to-carbon double bonds. These alkenyl radicals include the alkadienyl radicals containing from 4 to about 20 carbon atoms. The preferred cycloalkyl radicals are those containing from about 4 to about 8 ring carbon atoms. The preferred cycloalkenyl radicals are those containing from about 4 to about 8 ring carbon atoms. These cycloalkenyl radicals may contain either one or two ring olefinic unsaturations, i.e., 1 or 2 ring carbon-to-carbon double bonds. The preferred aralkyl and alkaryl radicals are those containing from 7 to about 14 carbon atoms. The preferred aryl radicals are those containing from 6 to 12 ring carbon atoms, i.e., phenyl, naphthyl and biphenyl.

The substituted monovalent hydrocarbon radicals represented by $R^{31}$-$R^{34}$ are those monovalent hydrocarbon radicals described above which contain at least one, preferably from 1 to about 3, substituent groups thereon. The preferred substituent groups are the halogens, hydroxyl, nitro, and amino groups. The substituent groups may be the same or different.

A preferred class of alkenes of Formula X are those wherein at least $R^{31}$ and $R^{32}$ or $R^{33}$ and $R^{34}$ are independently selected from monovalent hydrocarbon radicals or substituted monovalent hydrocarbon radicals, e.g., $R^{31}$ and $R^{32}$ are both independently selected from monovalent hydrocarbon radicals while $R^{33}$ and $R^{34}$ are independently selected from hydrogen, monovalent hydrocarbon radicals or substituted monovalent hydrocarbon radicals.

Another preferred class of alkenes of Formula X are those wherein at least one of $R^{31}$ or $R^{32}$ and at least one of $R^{33}$ or $R^{34}$ are independently selected from aryl, substituted aryl, aralkyl, or substituted aralkyl radicals, e.g., $R^{31}$ and $R^{33}$ both are aryl or aralkyl while $R^{32}$ and $R^{34}$ are independently selected from hydrogen, monovalent hydrocarbon radicals and substituted monovalent hydrocarbons.

Yet another preferred class of alkenes of Formula X are those wherein at least one of $R^{31}$-$R^{34}$ is the metharyl radical or substituted metharyl radical, e.g., allyl phenol.

Some illustrative non-limiting examples of the alkenes include 2,4-dimethyl-1-pentene, limonene, 2-phenyl-2-pentene, 2,4-dimethyl-1-pentene, 1,4-diphenyl-1,3-butadiene, and 2-methyl-1-undecane.

$R^{31}$-$R^{34}$ can be linked to form cyclic structures, i.e., cycloalkenes. These cycloalkenes may be represented by the formula

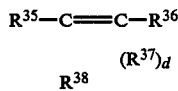

Xa.

wherein:
$R^{35}$ and $R^{36}$ are independently selected from hydrogen, monovalent hydrocarbon radicals, and substituted monovalent hydrocarbon radicals, with the proviso that at least one of $R^{35}$ and $R^{36}$ is a monovalent or substituted monovalent hydrocarbon radical;

$R^{37}$ is a monovalent hydrocarbon radical, a substituted monovalent hydrocarbon radical, a halogen radical, or a hydroxyl radical;

$R^{38}$ is a divalent hydrocarbon radical; and d has a value of from 0 up to the number of replaceable hydrogen atoms present on $R^{38}$.

The monovalent hydrocarbon radicals and substituted monovalent hydrocarbon radicals represented by $R^{35}$-$R^{37}$ are those as described for $R^{31}$-$R^{34}$ above.

The divalent hydrocarbon radicals represented by $R^{38}$ include the alkylene and alkenylene radicals. The preferred alkylene radicals are those containing from 2 to about 8 carbons. Preferred alkenylene radicals are those containing from 2 to about 8 carbons. These alkenylene radicals may contain either one or two olefinic unsaturation sites, i.e., one or two carbon-to-carbon double bonds. The alkenylene or alkylene radicals represented by $R^{38}$ together with the —C=C— structure preferably form a 4 to about a 10 membered cycloalkene containing from 1 to three olefinic unsaturations. The ring is olefinic in character, i.e., it is not aromatic such as benzene.

Some illustrative non-limiting examples of these cycloalkylene radicals include 1,3-cyclohexadiene, cyclopentene, cyclohexene, 3-ethylcyclopentene and 1,3-cyclopentadiene.

Suitable alcohol stabilizer compounds for use herein may be selected from mono-, di-, or polyhydroxy compounds. Generally, the hydroxy compounds will contain from 2 to about 50 carbon atoms and can be aliphatic, cycloaliphatic, aliphaticaromatic, or aromatic. These compounds may be represented by the formula $$R^{39}\text{---}(OH)_c \qquad \text{XI}$$

wherein $R^{39}$ is a c valent hydrocarbon or substituted hydrocarbon moiety and c is an integer having a value of from 1 up to the number of replaceable hydrogen atoms present on $R^{39}$. In one embodiment of the invention c is one, while in a second embodiment c is at least two.

The c valent hydrocarbon moieties represented by $R^{39}$ include the aliphatic, cycloaliphatic, aliphaticaromatic, and aromatic moieties. The aliphatic moieties may be straight chain or branched. They may be fully saturated or contain olefinic unsaturation. Likewise, the cycloaliphatic moieties may be fully saturated or may contain ring unsaturation. Some illustrative examples of monovalent hydrocarbon moieties, i.e., when c is one, include alkyl, alkenyl, cycloalkyl, cycloalkenyl, alkaryl, aralkyl, and aryl moieties. Some illustrative non-limiting examples of divalent hydrocarbon moieties, i.e., when c is 2, include the alkylene, alkenylene, cycloalkylene, cycloalkenylene, alkarylene, aralkylene, and arylene moieties.

The cycloaliphatic and aromatic moieties may be mononuclear, i.e., contain only one ring, or polynuclear, i.e., contain two or more rings. Additionally, an aromatic ring can be joined or fused with a non-aromatic ring.

Preferred acyclic aliphatic moieties are those that contain from 2 to about 50 carbon atoms. The cyclic aliphatic moieties are those that contain from 4 to about 16 ring carbon atoms in one or more rings. The preferred aromatic moieties are those containing from 6 to about 14 carbon atoms in one, two or three rings.

These c valent hydrocarbon moieties may contain substituent groups thereon. The number of substituent groups may vary but is preferably from one to about 4. The preferred substituent groups are the halogens, nitro groups, and amine groups.

Of the compounds of Formula XI the dihydroxy, e.g., diols, and polyhydroxy, e.g., polyols, are quite useful. By way of illustration the diols include the aliphatic diols such as ethylene glycol, propylene glycol, 1,3-propanediol, 1,4-butanediol, meso-2,3-butanediol, 1,2-pentanediol, 2,3-pentanediol 1,4-pentanediol, 1,6-hexanediol, 1,4-hexanediol, 2,3-dimethyl-1,3-butanediol and 1,1,2,2-tetraphenyl-1,2-ethanediol; the cyclic diols such as 1,2-cyclopentanediol and 1,2-cyclohexanediol; and the aromatic diols such as catechol and resorcinol. Some illustrative non-limiting examples of polyols include glycerol, pyrogallol, phloroglucinol, 1,2,3,4-butanetetraol, and 1,2,5,6-hexanetetraol.

The preferred diols and polyols are those in which at least one of the hydroxy functionalities is a tertiary hydroxy, for example, 2,5-dimethyl-2,5-hexanediol, 2-methyl-2,4-pentanediol, and 1,1,2,2-tetraphenyl-1,2-ethanediol.

A second preferred class of alcohols is the alkenols. These alkenols may have multiple points of unsaturation with hydroxy substitution occurring on either a saturated or unsaturated carbon. Effective alkenols include 4-methyl-4-penten-2-ol, 3-methyl-4-penten-3-ol, 2-methyl-4-penten-2-ol, 2,4-dimethyl4-penten-2-ol, 2-phenyl-4-penten-2-ol, and 9-decen-1-ol.

A third preferred class of alcohols is the tertiary alcohols which contain at least one hydroxy substituted tertiary carbon atoms. Specific compounds include aliphatic tertiary alcohols such as 2-methyl-2,4-pentanediol, 2-phenyl-2-propanol, 3-hydroxy-3-methyl-2-butanone, 2-phenyl-2-butanol, and the like; and cycloaliphatic tertiary alcohols such as 1-hydroxy-1-methyl cyclohexane.

A fourth preferred class of alcohols is hydroxy methyl aromatics. The hydroxy methyl aromatics are intended to encompass those compounds having hydroxy substitution on a saturated carbon attached to an unsaturated carbon in an aromatic ring. These compounds may be represented by the general formula

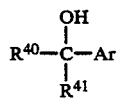

XIa.

wherein:
Ar is a substituted or unsubstituted aromatic radical; $R^{40}$ is a monovalent hydrocarbon radical, H, a substituted monovalent hydrocarbon radical, a monovalent hydrocarbonoxy radical, or a substituted monovalent hydrocarbonoxy radical; and $R^{41}$ is a hydrogen, a monovalent hydrocarbon radical, a substituted monovalent hydrocarbon radical, a monovalent hydrocarbonoxy radical, or a substituted monovalent hydrocarbonoxy radical.. The monovalent hydrocarbon, substituted monovalent hydrocarbon, monovalent hydrocarbonoxy, and substituted monovalent hydrocarbonoxy radicals are the same as those defined hereinafore for $R^{18}$ in VIII. The preferred aromatic radical represented by Ar is phenyl or naphthyl. The hydroxy substituted saturated carbon atom may be a simple methylol group ($-CH_2OH$) or it may be a member of a more complex hydrocarbon group, such as would be the case with ($-CR^{40}HOH$) or ($-CR^{40}R^{41}OH$) wherein $R^{40}$ and $R^{41}$ are other then hydrogen. Some illustrative non-limiting examples of hydroxy methyl aromatics include benzhydrol, 1,3-benzenedimethanol, benzyl alcohol, 4-benzyl oxybenzyl alcohol, and benzyl alcohol.

The epoxides useful as stabilizing agents in the instant invention are well known compounds which are amply described in the literature and which are generally commercially available or may be readily prepared by known conventional methods. These compounds are characterized by containing at least one oxirane

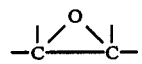

ring.

One useful group of epoxide compounds may be represented by the general formula

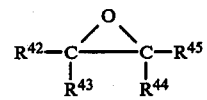

XII.

wherein:
$R^{42}$–$R^{45}$ are independently selected from hydrogen, monovalent hydrocarbon radicals, substituted monovalent hydrocarbon radicals, $-CH_2OR^{46}$, $-CH_2OCOR^{46}Z$, $-COOCH_2Z$, and $-CH_2OR^{47}OCH_2Z$ radicals wherein $R^{46}$ is selected from alkyl radicals, cycloalkyl radicals, aryl radicals, aralkyl radicals or alkaryl radicals, $R^{47}$ is a divalent hydrocarbon radical, e.g., an alkylene radical or a cycloalkylene radical, and Z is an oxirane ring.

The monovalent hydrocarbon radicals and substituted monovalent hydrocarbon radicals represented by $R^{42}$–$R^{45}$ are those as described for $R^3$ hereinafore, i.e., alkyl, alkenyl, cycloalkyl, cycloakenyl, aryl, aralkyl, and alkaryl radicals, and the substituted alkyl, substituted alkenyl, substituted cycloalkyl, substituted cycloalkenyl, substituted aryl, substituted aralkyl, and substituted alkaryl radicals.

The preferred alkyl, cycloalkyl, aryl, alkaryl, and aralkyl radicals represented by $R^{46}$ are those described for $R^3$ hereinafore.

The preferred alkylene radicals represented by $R^{47}$ are those containing from 1 to about 24 carbon atoms. The preferred cycloalkylene radicals represented by $R^{47}$ are those containing from 4 to about 16 ring carbon atoms.

The preferred epoxides of Formula XII are those wherein at least $R^{42}$ and $R^{43}$ or $R^{44}$ and $R^{45}$ are independently selected from monovalent hydrocarbon radicals, substituted monovalent hydrocarbon radicals, $-CH_2OR^{46}$, $-CH_2OCOR^{47}Z$, $-COOCH_2Z$, and $-CH_2OR^{47}OCH_2Z$ radicals e.g., both $R^{42}$ and $R^{43}$ are monovalent hydrocarbon radicals while Rhu 44 and $R^{45}$ can independently be hydrogen or monovalent hydrocarbon radicals, substituted monovalent hydrocarbon radicals $-CH_2OR^{46}$, $-CH_2OCOR^{47}Z$, $-COOCH_2Z$, and $-CH_2OR^{47}OCH_2Z$ radicals.

These types of epoxides are well known in the art and are amply described in the literature, for example U.S. Pat. No. 4,092,288, incorporated herein by reference.

Another useful group of epoxides may be represented by the general formula

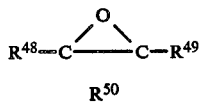
XIIa.

wherein:
$R^{48}$ and $R^{49}$ independently have the same meaning as $R^{42}$-$R^{45}$ described hereinafore, with the proviso that at least one of $R^{48}$ or $R^{49}$ is other than hydrogen; and
$R^{50}$ is a divalent hydrocarbon radical or a substituted divalent hydrocarbon radical which together with the two carbon atoms of the oxirane ring forms a ring system containing from 1 to 3 rings having from 4 to about 20 ring carbon atoms.

The preferred divalent and substituted divalent hydrocarbon radicals are the aliphatic divalent and substituted divalent aliphatic hydrocarbon radicals. These aliphatic radicals may be fully saturated or may contain one or two olefinic unsaturation sites. The preferred divalent aliphatic hydrocarbon radicals and substituted divalent aliphatic hydrocarbon radicals are the alkylene, alkenylene, cycloalkylene, and cycloalkenylene radicals with the alkylene and alkenylene radicals being preferred. The preferred alkylene radicals are those containing from 2 to about 18 ring carbon atoms. The preferred alkenylene radicals are those containing from 2 to about 18 carbon atoms.

The substituted divalent hydrocarbon radicals, preferably the substituted divalent aliphatic hydrocarbon radicals contain from 1 to about 4 substituent groups. The preferred substituent groups are the $C_1$—$C_{24}$ alkyls, $C_4$-$C_{10}$ cycloalkyls, aralkyls or alkaryls of from 7 to about 14 carbon atoms, aryls or from 6 to 12 ring carbon atoms, halogens, and hydroxyl. When more than one substituent group is present they may be the same or different.

These types of epoxides are described in U.S. Pat. No. 4,154,329, incorporated herein by reference.

The epoxides of Formula XIIa include the derivatives of epoxy cyclohexane. These derivative may be represented by the formula

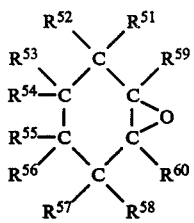
XIIb.

wherein:
$R^{51}$-$R^{60}$ independently have the same meaning as $R^{42}$-$R^{45}$ above with the proviso that at least one of $R^{59}$ or $R^{60}$ is a monovalent or substituted monovalent valent hydrocarbon radical.

These derivatives of epoxy cyclohexanes are well known compounds and are described, along with other derivatives of epoxy cyclohexane, inter alia, in U.S. Pat. No. 3,978,020, incorporated herein by reference.

Yet another group of epoxides may be represented by the formula

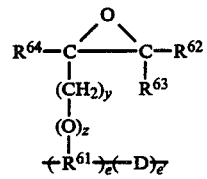
XIIc.

wherein:
$R^{62}$-$R^{64}$ are independently selected from hydrogen, monovalent hydrocarbon radicals, and substituted monovalent hydrocarbon radicals of the type described for $R^3$ hereinafore, with the proviso that at least $R^{64}$ or both $R^{62}$ and $R^{63}$ are independently selected from monovalent hydrocarbon radicals or substituted monovalent hydrocarbon radicals;
$R^{61}$ is a divalent hydrocarbon radical or a substituted divalent hydrocarbon radical;
e has a value of at least one;
e' has a value of 0 or at least one;
y is zero, one, two, three or four;
z is either zero or one with the proviso that y and z are not zero at the same time;
D is a divalent hydrocarbon radical or a substituted divalent hydrocarbon radical.

The divalent hydrocarbon radicals represented by $R^{61}$ and D may be aliphatic, aromatic, or aliphatic-aromatic. These divalent hydrocarbon radicals include alkylene, alkylidene, cycloalkylene, cycloalkylidene, arylene, substituted arylene, alkarylene, and aralkylene radicals. The preferred alkylene radicals are those containing from 2 to about 20 carbon atoms. The preferred alkylidene radicals are those containing from 1 to about 20 carbon atoms. The preferred cycloalkylene and cycloalkylidene radicals are those containing from 4 to about 16 ring carbon atoms. The preferred arylene radicals are those containing from 6 to 12 ring carbon atoms. The preferred aralkylene and alkarylene radicals are those containing from 7 to about 14 carbon atoms.

Illustrative of the epoxides of Formula XIIc are those wherein z is one, e' is zero, and $R^{61}$ is a divalent aliphatic-aromatic radical represented by the formula

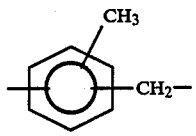

These types of epoxides are well known in the art and are generally commercially available or may be readily prepared by known and conventional methods.

Some illustrative non-limiting examples of the epoxides which may be utilized herein include limonene dioxide, limonene monoxide, alpha-pinene oxide, tetraphenylethylene epoxide, tetramethylene ethylene oxide, 1,1-diphenylethylene oxide, 2,3-epoxy-2,3-dimethylbutane, 4,5-epoxy-4,5-dimethyloctane, 1,2-epoxy-2-methylpropane-4,5-epoxy-4-methyloctane, 1,2-diphenylethylene oxide, 1,2-epoxy-1-phenyl-2-methyl propane, 1,1-dicyclohexaneethylene oxide, 1,2-epoxy-2-methyl-cyclohexane, 1,2-epoxy-1,2-dimethylcyclohexane, 1,2-epoxy-1-phenyl-cyclohexane, 1,2-epoxy-1-propyl-cyclohexane, 1,2-epoxy-1,2,3,5-tetramethylcyclohexane, 1,2-epoxy-1-methyl-2-t-butyl-cyclohexane, 2,3-epoxy-3-methylbutane, and 2,3-epoxy-3-phenylbutane.

The stabilizing compounds of the instant invention may be used individually or they may be utilized as mixtures of two or more different stabilizing compounds. Thus, for example, the mixture may contain two or more different epoxide compounds; two or more different alcohol compounds; two or more different hydro-aromatics; an epoxide and a hydroaromatic; an epoxide and an alcohol compound; an epoxide and an alkene; an epoxide, a hydroaromatic and an alkene; and an epoxide, a cyclic ether, and an alcohol.

Additionally, suitable stabilizing compounds may be members of more than one of the aforedescribed groups. In other words, a single compound may have two or more functionalities characteristic of the groups as described hereinafore, e.g., it may contain both an oxirane ring and olefinic unsaturation.

The effectiveness of the stabilizing compound(s) will generally vary somewhat depending upon the type of compound utilized. Generally, however, the amount of compound utilized is a stabilizing amount. By stabilizing amount is meant an amount effective to stabilize the sterilizing irradiated composition against yellowing. That is to say, an amount which is effective to inhibit or reduce yellowing of a composition which has been exposed to sterilizing radiation. Generally, this amount is at least about 0.01 weight percent, preferably at least about 0.05 weight percent. Weight percent of stabilizing compound is based on the total amounts of stabilizing compound and polysulfone resin present. The upper limit of stabilizing compound is such that it should not significantly affect, to a significant degree, substantially most of the advantageous properties of the polysulfone resin. This amount is generally less than about 5 weight percent, preferably less than about 2 weight percent. Thus, the instant compositions contain from about 0.01 to about 5 weight percent, preferably from about 0.05 to about 2 weight percent of stabilizing compound.

The radiation employed to achieve sterilization of the particular object is ionizing radiation, usually gamma radiation produced from a cobalt-60 or cesium-137 radioactive nuclei. The quantity of gamma radiation required for sterilization is generally from about 0.5 to about 7 megarads. A second type of radiation electron beam radiation is also suitable for sterilization. Electron beam radiation is produced in a high voltage electron accelerator.

The composition of the instant invention may optionally contain the commonly used and well known additives such as, for example,: antioxidants; mold release agents; impact modifiers; inert fillers such as glass, mica, clay, and talc; ultraviolet radiation absorbers such as the benzophenones, benzotriazoles, cyanoacrylates, and benzylidene malonates; and flame retardants such as the alkali and alkaline earth metal salts of sulfonic acids Some of these alkali and alkaline earth metal salts of organic sulfonic acids are described, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are incorporated herein by reference.

The compositions of the instant invention are prepared by standard techniques, for example, by simple blending or dry mixing and melt extruding at an elevated temperature. The extruded mixture is then molded into a piece of specific dimensions or further extruded into a film or sheet product.

DESCRIPTION OF THE PREFERRED EMBODIMENTS

In order to more fully and clearly illustrate the present invention the following examples are set forth. It is intended that the examples be considered as illustrative rather limiting the invention as disclosed and claimed herein. In the examples all parts and percents are on a weight basis unless otherwise specified.

The following example falls outside the scope of the instant invention and is presented for comparative purposes only. This example is the control.

EXAMPLE 1

A polysulfone resin (UDEL 1700 from Union Carbide) was extruded on a Sterling single screw extruder (1¾") at a melt temperature of 600° F. Test plaques ⅛" thick were injection molded using a 600° F. melt set temperature, a 200° F. mold set temperature, and a 10/20 cycle time on a 3 oz. Van Dorn. These test plaques were exposed to a $Co^{60}$ source on a continuous conveyor system, dosimetry was monitored with a calibrated NBS radiochromic, nylon dosimeter. The Y.I. (Yellowness Index) was measured on a Gardner colorimeter in accordance with ASTM D1925 both before irradiation and after the test plaques had been exposed to 3.1/3.2 megarads (MRADS) and 5.2/5.6 megarads. The results of these Y.I. measurements are set forth in Table I.

The following examples illustrate the compositions of the instant invention.

EXAMPLE 2

A resin mixture was prepared by intimately blending 100 parts by weight of the polysulfone resin used in Example 1 with 0.1 part by weight of 2-methyl-2,4-pentanediol. The resin mixture was extruded as in Example 1 and test plaques were prepared in accordance with the procedure of Example 1. The Y.I. of these test plaques was determined in accordance with the procedure of Example 1. The results are set forth in Table I.

EXAMPLE 3

A resin mixture was prepared by mixing 100 parts by weight of the polysulfone resin of Example 1 with 0.09 parts by weight of benzyl alcohol. The resin mixture was extruded as in Example 1 and test plaques were prepared in accordance with the procedure of Example 1. The Y.I. of these test plaques was determined in accordance with the procedure of Example 1. The results are set forth in Table I.

EXAMPLE 4

A resin mixture was prepared by physically blending 100 parts by weight of the polysulfone resin of Example 1 with 0.13 parts by weight of limonene. The resin mixture was extruded as in Example 1 and test of Example 1. The Y.I. of these test plaques was determined in accordance with the procedure of Example 1 The results are set forth in Table I.

EXAMPLE 5

A resin mixture was prepared by physically blending 100 parts by weight of the polysulfone resin of Example 1 with 0.11 parts by weight of 3,4-dihydroxy-2-ethoxy-2-pyran. The resin mixture was extruded as in Example 1 and test plaques were prepared in accordance with the procedure of Example 1. The Y.I. of these test plaques was determined in accordance with the procedure of Example 1. The results are set forth in Table I.

EXAMPLE 6

A resin mixture was prepared by physically blending 100 parts by weight of the polysulfone resin of Example 1 with 0.1 parts by weight of 1,3-dithiane. The resin mixture was extruded as in Example 1 and test plaques were prepared in accordance with the procedure of Example 1. The Y.I. of these test plaques was determined in accordance with the procedure of Example 1. The results are set forth in Table I.

The following example falls outside the scope of the instant invention and is presented for comparative purposes only.

EXAMPLE 7

A polysulfone resin (UDEL 1700) was extruded as in Example 1 and test plaques were prepared substantially in accordance with the procedure of Example 1. These test plaques were irradiated substantially in accordance with the procedure of Example 1 except that they were exposed to 2.4/2.6 MRADS and 5.8/6.1 MRADS. The Y.I. of the test plaques was measured in accordance with the procedure of Example 1 before and after irradiation. The results are set forth in Table II.

The following example illustrates the composition of the instant invention.

EXAMPLE 8

A resin mixture was prepared by intimately blending 100 parts by weight of the polysulfone resin used in Example 7 with 0.12 parts by weight of 1,2,3,4-tetrahydro-1-naphthol. The resin mixture was extruded as in Example 7 and test plaques were prepared in accordance with the procedure of Example 7. The Y.I. of these test plaques was determined in accordance with the procedure of Example 7. The results are set forth in Table II.

As illustrated by the data in Tables I and II the compositions of the instant invention, i.e., Examples 2–6 and 8, exhibit improved color properties, i.e., improved resistance to yellowing, upon exposure to radiation, more specifically sterilizing radiation, than the unstabilized polysulfone resin of Examples 1 and 7. This improved resistance to yellowing is illustrated in both absolute terms, i.e., the actual Y.I itself, and in relative terms, i.e., the change in the Y.I. This improvement in resistance to yellowing is achieved at relatively low loadings of the stabilizers of the instant invention. Thus, due to the relatively low amounts of stabilizer compounds required the instant polysulfone resin compositions retain, to a substantial degree, substantially most of the advantageous physical properties of the polysulfone resins while simultaneously exhibiting better or improved color and resistance to yellowing upon exposure to sterilizing radiation than the unstabilized polysulfone resin.

The preferred stabilizing compounds, from the standpoint of the instant invention, are those selected from thio compounds, preferably the thioethers; the alcohols, preferably those alcohols selected from alcohols containing at least one hydroxyl group bonded to a tertiary carbon atom, the diols and polyols, preferably those diols and polyols which contain at least one hydroxyl group bonded to a tertiary carbon atom, and the benzylic alcohols; the hydroaromatics; the cyclic ethers, preferably the partially or fully hydrogenated hydrocarbonoxy substituted derivative of pyran and furan; the epoxides; and the alkenes.

In the preparation of the compositions of the instant invention the stabilizing compound is intimately blended or mixed with the polysulfone resin so that it is dispersed throughout the resin. The resultant articles prepared from the instant compositions will thus contain the stabilizing compound dispersed in generally equal amounts throughout said articles, e.g. in the interior and at the surfaces of said articles. It is important that the stabilizing compound be dispersed through the entire article, i.e., in its interior, rather than being concentrated just at the surfaces of these articles.

Obviously, other modification and variations of the present invention are possible in light of the above teachings. It is, therefore, to be understood that changes may be made in the particular embodiments of the instant invention as described herein which are within the full intended scope of the invention as defined by the appended claims.

What is claimed is:

1. A radiation sterilized polysulfone resin composition exhibiting improved color properties comprised of: (i) at least one polysulfone resin; and (ii) an amount effective to inhibit or diminish yellowing of said polysulfone resin upon exposure to sterilizing radiation of at

TABLE I

| Example No. | Additive | Wt. % additive | Y.I. (0 MRAD) | Y.I. (3.1/3.2 MRAD) | Y.I. (5.2/6.6 MRAD) |
|---|---|---|---|---|---|
| 1 | none | 0 | 9.9 | 27.3 | 36.6 |
| 2 | 2-methl-2,4-pentane diol | 0.1 | 4.7 | 19.1 | 25.1 |
| 3 | benzyl alcohol | 0.09 | 2.4 | 16.4 | 23.7 |
| 4 | limonene | 0.13 | 2.3 | 20.0 | 27.8 |
| 5 | 3,4-dihydro-2-ethoxy-2-pyran | 0.11 | 2.6 | 18.6 | 24.5 |
| 6 | 1,3-dithiane | 0.1 | 6.0 | 16.9 | 23.1 |

TABLE II

| Example No. | Additive | Wt. % additive | Y.I. (0 MRAD) | Y.I (2.4/2.6 MRAD) | Y.I. (5.8/6.1 MRAD) |
|---|---|---|---|---|---|
| 7 | none | 0 | 11.7 | 23.6 | 46.1 |
| 8 | 1,2,3,4-tetrahydro-1-naphthol | 0.12 | 3.7 | 16.3 | 26.5 | least one stabilizing alcohol compound of 2 to about 50 carbon atoms.

2. The composition of claim 1 wherein said polysulfone resin is a polyarylethersulfone resin.

3. The composition of claim 1 which contains at least about 0.01 weight percent of at least one stabilizing alcohol compound.

4. The composition of claim 3 which contains at least about 0.05 weight percent of at least one stabilizing alcohol compound.

5. The composition of claim 1 wherein said alcohol is selected from diols or polyols.

6. The composition of claim 11 wherein said diols and polyols contain at least one hydroxyl group bonded to a tertiary carbon atom.

7. The composition of claim 10 wherein said alcohol is a tertiary alcohol.

8. The composition of claim 10 wherein said alcohol is a hydroxy methyl aromatic having hydroxy functionality on a saturated carbon attached to a ring carbon atom of an aromatic ring system.

9. The composition of claim 8 wherein said alcohol is benzyl alcohol.

* * * * *

UNITED STATES PATENT AND TRADEMARK OFFICE
CERTIFICATE OF CORRECTION

PATENT NO. : 4,873,278        Page 1 of 2

DATED : October 10, 1989

INVENTOR(S) : Linda Harmon Nelson

It is certified that error appears in the above-identified patent and that said Letters Patent is hereby corrected as shown below:

Col. 4, line 62 - Delete "safe" and add "same"

Col. 6, line 50 - Delete "cycloradi-" and add "cyclo-"

Col. 6, line 51 - Delete "cals"

Col. 8, line 14 - between "said" and "bond" add "carbon atom of $R^{17}$ by either a single or double"

Col. 9, line 55 - Add "$R^{20}$" after "and"

Col. 9, line 59 - Delete "droradical" and add "drocarbon"

Col. 9, line 59 - Delete "carbon"

Col. 13, line 29 - Add "-" after "dimethyl"

Col. 14, line 32 - Delete "$-CH_{2O}OR^{46}$" to -- $-CH_2OR^{46}$ --.

Col. 14, line 61 - Delete "Rhu" and add "R"

Col. 18, line 57 - Delete "of Example"

Col. 18, line 58 - Delete "1."

Col. 18, line 57 - After "test" add "plaques were prepared in accordance with the procedure of Example 1."

UNITED STATES PATENT AND TRADEMARK OFFICE
CERTIFICATE OF CORRECTION

PATENT NO. : 4,873,278

DATED : October 10, 1989

INVENTOR(S) : Linda Harmon Nelson

It is certified that error appears in the above-identified patent and that said Letters Patent is hereby corrected as shown below:

Col. 22, line 1 -Delete "11" and add "5".

Col. 22, line 4 - Delete "10" and add "5"

Col. 22, line 6 - Delete "10" and add "5"

Signed and Sealed this

Fifteenth Day of January, 1991

Attest:

HARRY F. MANBECK, JR.

*Attesting Officer*   *Commissioner of Patents and Trademarks*